(12) United States Patent
Griffin et al.

(10) Patent No.: US 9,587,699 B1
(45) Date of Patent: Mar. 7, 2017

(54) SELF-TUNING TUNABLE MASS DAMPERS

(71) Applicant: The Boeing Company, Chicago, IL (US)

(72) Inventors: Steven F. Griffin, Kihei, HI (US); Daniel Niedermaier, League City, TX (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/840,024

(22) Filed: Aug. 30, 2015

(51) Int. Cl.
| | |
|---|---|
| *F16F 7/116* | (2006.01) |
| *F16F 7/10* | (2006.01) |
| *E04H 9/02* | (2006.01) |
| *F16F 7/104* | (2006.01) |
| *B64C 7/00* | (2006.01) |
| *E04B 1/98* | (2006.01) |

(52) U.S. Cl.
CPC .............. *F16F 7/1011* (2013.01); *B64C 7/00* (2013.01); *E04B 1/985* (2013.01); *E04H 9/027* (2013.01); *F16F 7/104* (2013.01); *F16F 7/116* (2013.01)

(58) Field of Classification Search
CPC .......... F16F 7/10; F16F 7/1005; F16F 7/1011; F16F 7/104; F16F 7/116; F16F 13/26; G01V 1/181; G01V 1/182; G01V 1/183
USPC ...... 267/140.14, 140.15; 188/378, 379, 380; 248/566, 605
See application file for complete search history.

(56) References Cited

U.S. PATENT DOCUMENTS

| | | | | |
|---|---|---|---|---|
| 4,922,159 A | * | 5/1990 | Phillips ................... | B64G 1/22 244/164 |
| 5,427,362 A | * | 6/1995 | Schilling ................ | H02K 33/18 188/267 |
| 6,476,702 B1 | * | 11/2002 | Hartwig ................ | F16F 7/1005 335/220 |
| 8,616,536 B2 | * | 12/2013 | Kim ....................... | F16F 7/1011 188/267 |
| 9,172,277 B2 | * | 10/2015 | Genderjahn ........... | F16K 31/082 |

FOREIGN PATENT DOCUMENTS

| | | | | |
|---|---|---|---|---|
| DE | 102010029910 A1 | * | 12/2011 | ............ F16F 7/1011 |
| DE | 102010030700 A1 | * | 1/2012 | ............. H02K 33/18 |
| ES | EP 2708316 A1 | * | 3/2014 | ......... B23Q 11/0039 |
| WO | WO 9961815 A1 | * | 12/1999 | .............. F16F 1/326 |

OTHER PUBLICATIONS

EPO translation DE 10 2010 030 700 A1, Forsen et al. Jan. 2012.*

* cited by examiner

*Primary Examiner* — Thomas J Williams
(74) *Attorney, Agent, or Firm* — Felix L. Fischer

(57) ABSTRACT

A tunable mass damper incorporates a frame and a voice coil supported in the frame. A magnet concentric with the voice coil is movable relative to the housing via the voice coil. A plurality of flexures having a first end extending from the magnet and an arm releasably coupled to the frame are adjustable to an effective length for a desired frequency of reciprocation of the magnet.

20 Claims, 9 Drawing Sheets

SELF-TUNING TUNABLE MASS DAMPERS

REFERENCE TO GOVERNMENT FUNDING

This invention was made with Government support under contract number NNK14MA75C—Commercial Crew Transportation Capability (CCtCap) with the National Aeronautics and Space Administration (NASA). The government has certain rights in this invention.

BACKGROUND INFORMATION

Field

Embodiments of the disclosure relate generally to the field of damping of dynamic resonance in aerospace structures and more particularly to a tuned mass damper (TMD) employing a voice coil/magnet combination as both an actuator and a lossy element for measuring and adjusting the TMD and structural response in an aerospace structure to which the TMD is attached and then adjusting the lossy element to self-tune the TMD for maximum reduction in dynamic response of the aerospace structure and TMD combination.

Background

Tuned mass dampers (TMDs) are heavily damped resonant devices which add damping to lightly damped vibrational modes of a structure by dynamically coupling into the lightly damped modes. In practice, a TMD is a damped spring/mass resonator that is tuned so that its frequency is close to a lightly damped mode on the host structure. The TMD is attached to the host structure at a location of large amplitude motion for the mode in question and its motion is coupled into the host structure's motion. If the TMD is tuned correctly, two damped vibrational modes result, which take the place of the original lightly damped mode of the host structure and heavily damped mode of the TMD. Since aerospace structures tend to respond unfavorably at lightly damped modes in the presence of a dynamic disturbance environment, introduction of one or several TMDs can greatly reduce the dynamic response of a structure by damping problematic modes.

One of the challenges associated with installation of TMDs is tuning. Tuning involves the determination of the correct values of uncoupled natural frequency and damping for the device that yields the best performance in the coupled device. Finite element models are helpful in predicting the host structure dynamics, which can then be used to determine the frequency, damping and mass of the TMD that gives the best performance, but the finite element model has to be very accurate to be useful. Measured mode shapes of the structure without TMDs can also be used to determine the frequency, damping and mass of the TMD that gives the best performance. A typical installation involves using a finite element model to determine the moving mass in the TMD and the range of damping and frequencies required. Experimental data is then used to "tune" the frequency, damping and mass to the values that cause the biggest response reduction in host structure response. This process is often tedious and requires several iterations.

It is therefore desirable to provide a self-tuning TMD to eliminate the tuning step, save time and result in better overall performance for damping to reduce the dynamic response of a structure by damping problematic modes.

SUMMARY

Embodiments disclosed herein provide a tunable mass damper having a frame and a voice coil supported in the frame. A magnet concentric with the voice coil is movable relative to the housing via the voice coil. A plurality of flexures having a first end extending from the magnet and an arm releasably coupled to the frame, said flexures adjustable for a desired frequency of reciprocation of the magnet.

A method for operation of a tunable mass damper includes attaching a TMD having a voice coil and concentric magnet as a moving mass to a host structure at a location with an anticipated large dynamic response. Flexure clamps are released and flexure length is adjusted on the TMD by using the voice coil to urge the magnet and associated ramps into contact with bearing guides to rotate the magnet and flexures to obtain a desired frequency of the TMD. The flexures are then reclamped for operation of the TMD.

The features, functions, and advantages that have been discussed can be achieved independently in various embodiments of the present disclosure or may be combined in yet other embodiments further details of which can be seen with reference to the following description and drawings.

DETAILED DESCRIPTION

Embodiments disclosed herein provide a TMD having a resilient element such as a spring, a moving mass and a lossy element to introduce damping. The spring is designed to guide the motion of the TMD for reciprocation on a desired axis through the TMD. If a shorted voice coil combined with a magnet is used as the lossy element, an added benefit can be realized by changing the resistance across the coil to change the damping. TMDs with voice coil loss mechanisms are commercially available from CSA/Moog (http://www-.csaengineering.com/products-services/tuned-mass-dampers-absorbers/tmd-products/). The self-tuning TMD disclosed in the present embodiment uses the voice coil/magnet combination as both an actuator and a lossy element which enables an innovative stiffness adjustment mechanism.

Figure 1A:
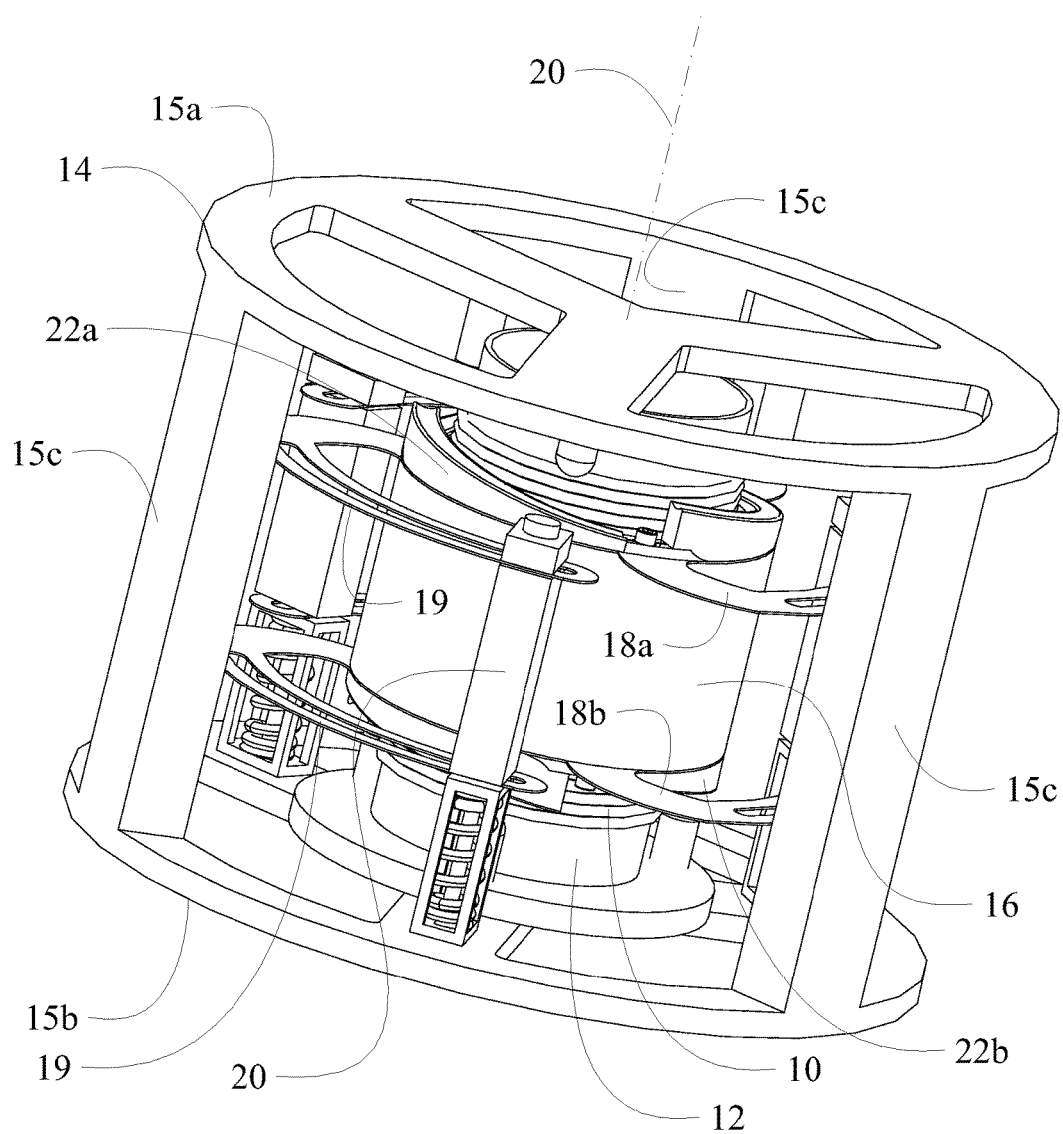
FIG. 1A is a perspective illustration of an exemplary embodiment of the TMD.
Figure 1B:
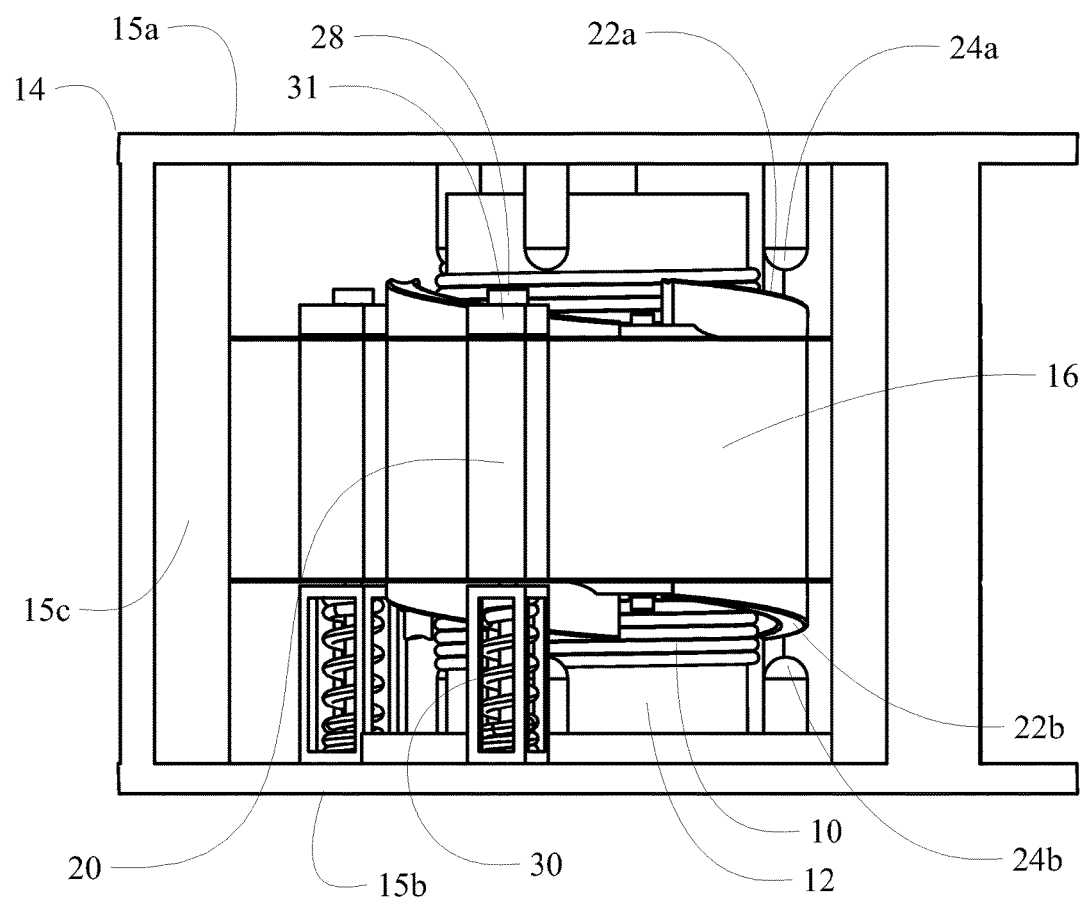
FIG. 1B is a side view of the embodiment of FIG. 1A.
Figure 1C:
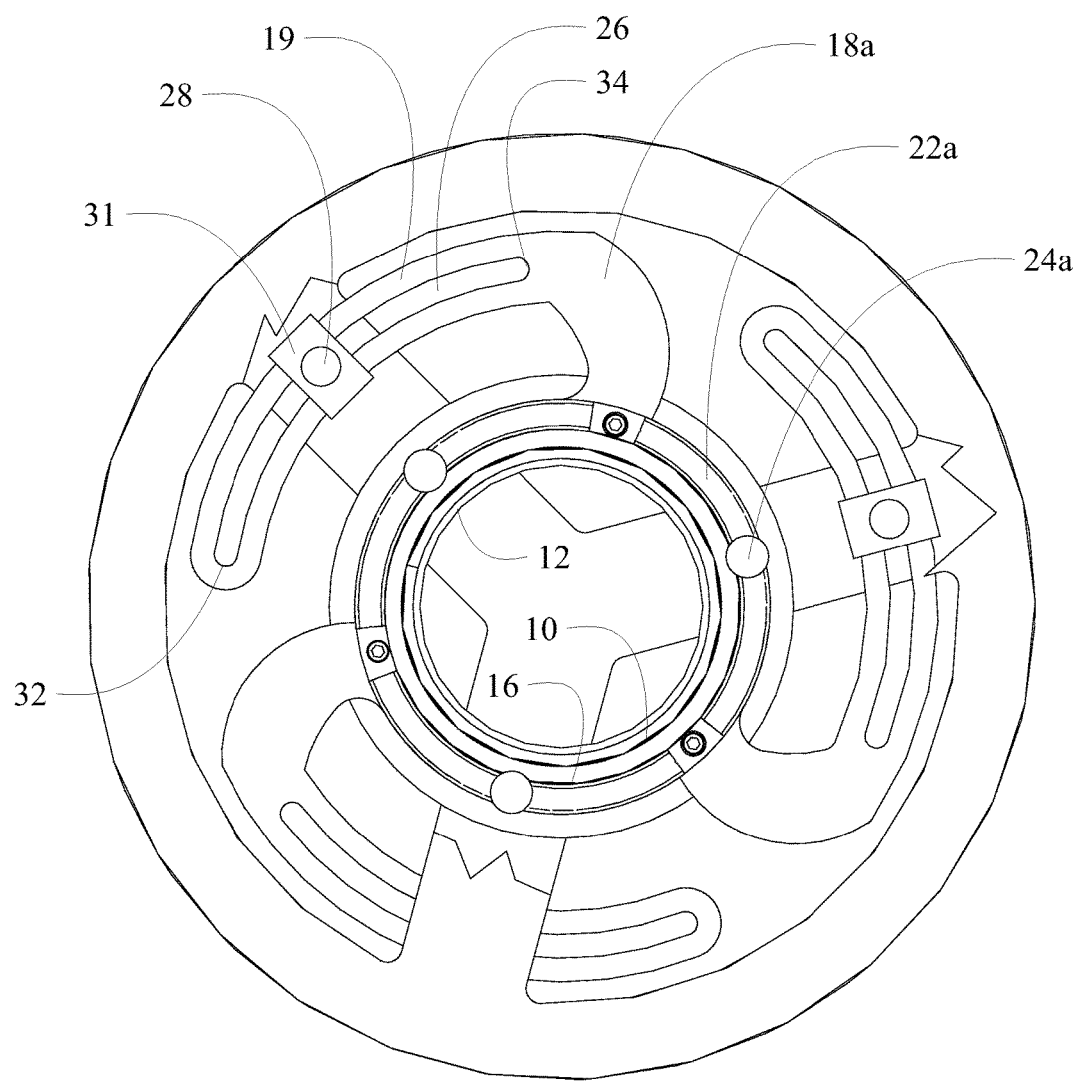
FIG. 1C is a top partial cutaway view of the embodiment of FIG. 1A.

The basic components of the self-tuning TMD are shown in FIGS. 1A-1C. A voice coil 10 with a core 12 is supported in a frame 14. For the embodiment shown, the frame employs a top flange 15a and a bottom flange 15b spaced apart and connected by columns 15c. While shown for the embodiment in the drawings as an open frame, a closed housing may be employed in alternative embodiments. A magnet 16, supported by resilient elements formed by semi-helical flexures 18a and 18b, concentrically surrounds the coil 10 and is movable relative to the housing via the voice coil 10. The magnet 16 provides the moving mass for the TMD that reciprocates concentrically on an axis 20. The flexures 18a and 18b are supported by pillars 20 extending from the frame 14. The plurality of flexures have a first end extending from the magnet 16 and an arm 19 releasably coupled to the frame 14. For the embodiment shown, the flexures 18a and 18b each have three symmetrical arms 19. In alternative embodiments the flexures may be supported by various attachments on the columns 15c replacing the pillars 20 and alternative numbers of arms and associated pillars may be employed for the flexures to support magnet 16.

Figure 2A:
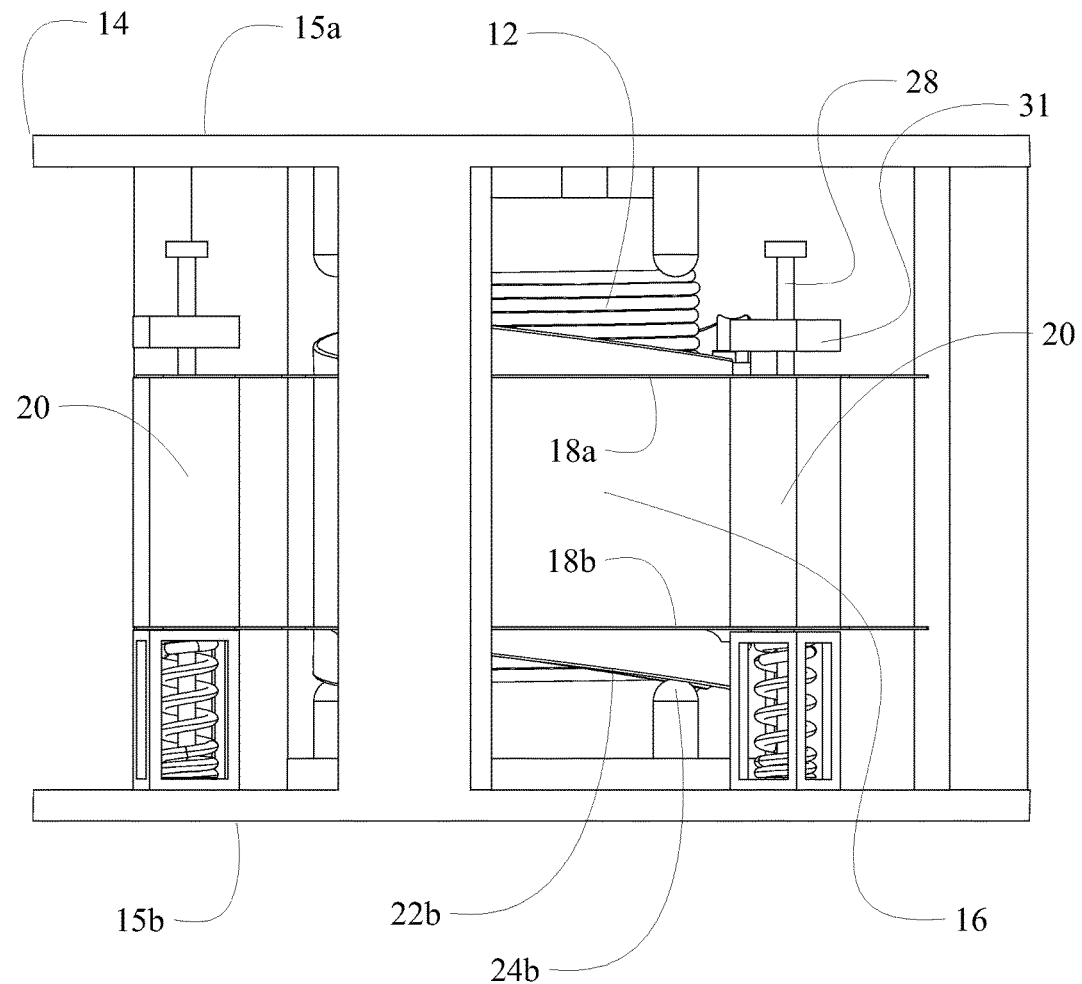
FIG. 2A is a side view of the TMD with the voice coil powered to engage the lower adjustment ramp for decreasing flexure length.
Figure 2B:
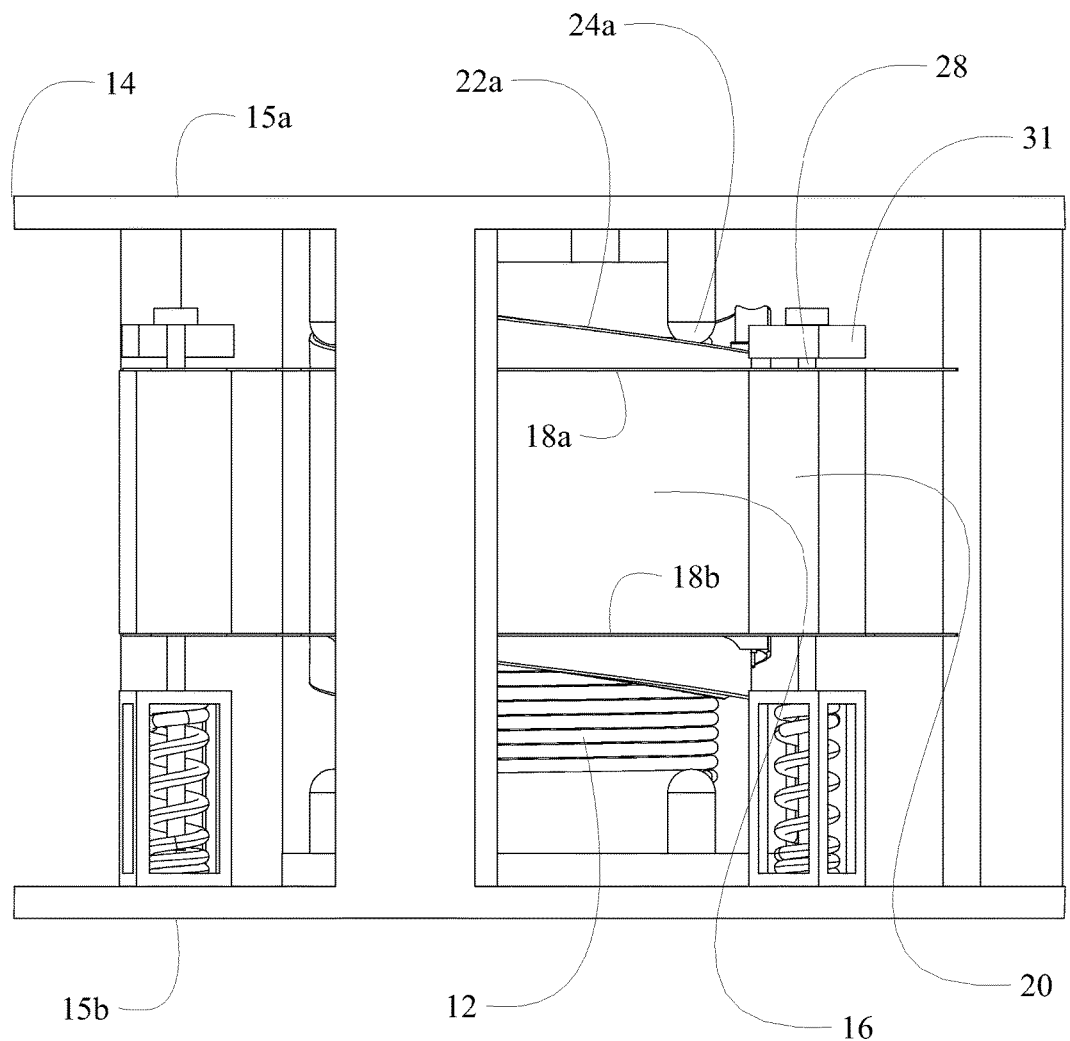
FIG. 2B is a side view of the TMD with the voice coil powered to engage the upper adjustment ramp for increasing flexure length.
Figure 3A:
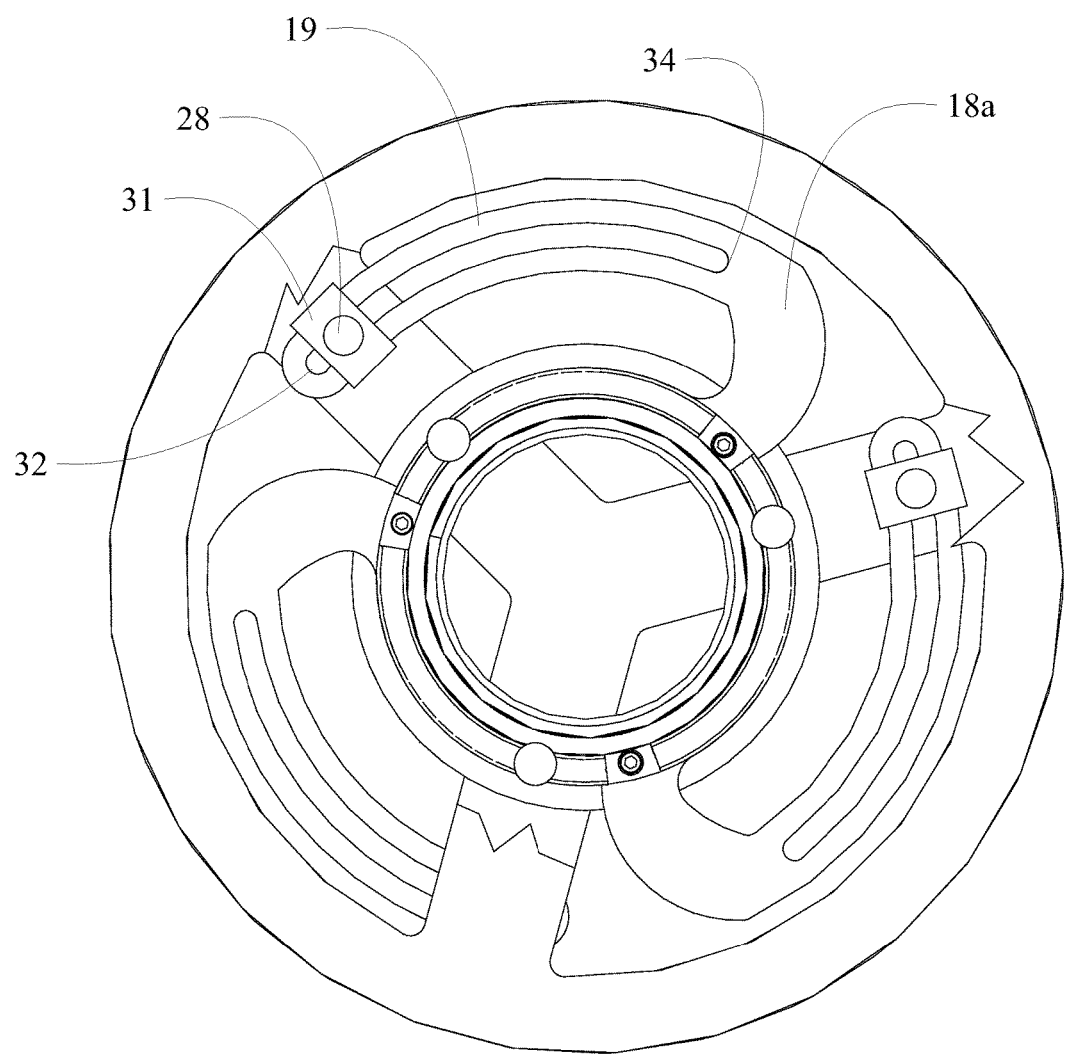
FIG. 3A is a top partial cutaway view of the TMD with the flexures rotated to substantially a maximum length.
Figure 3B:
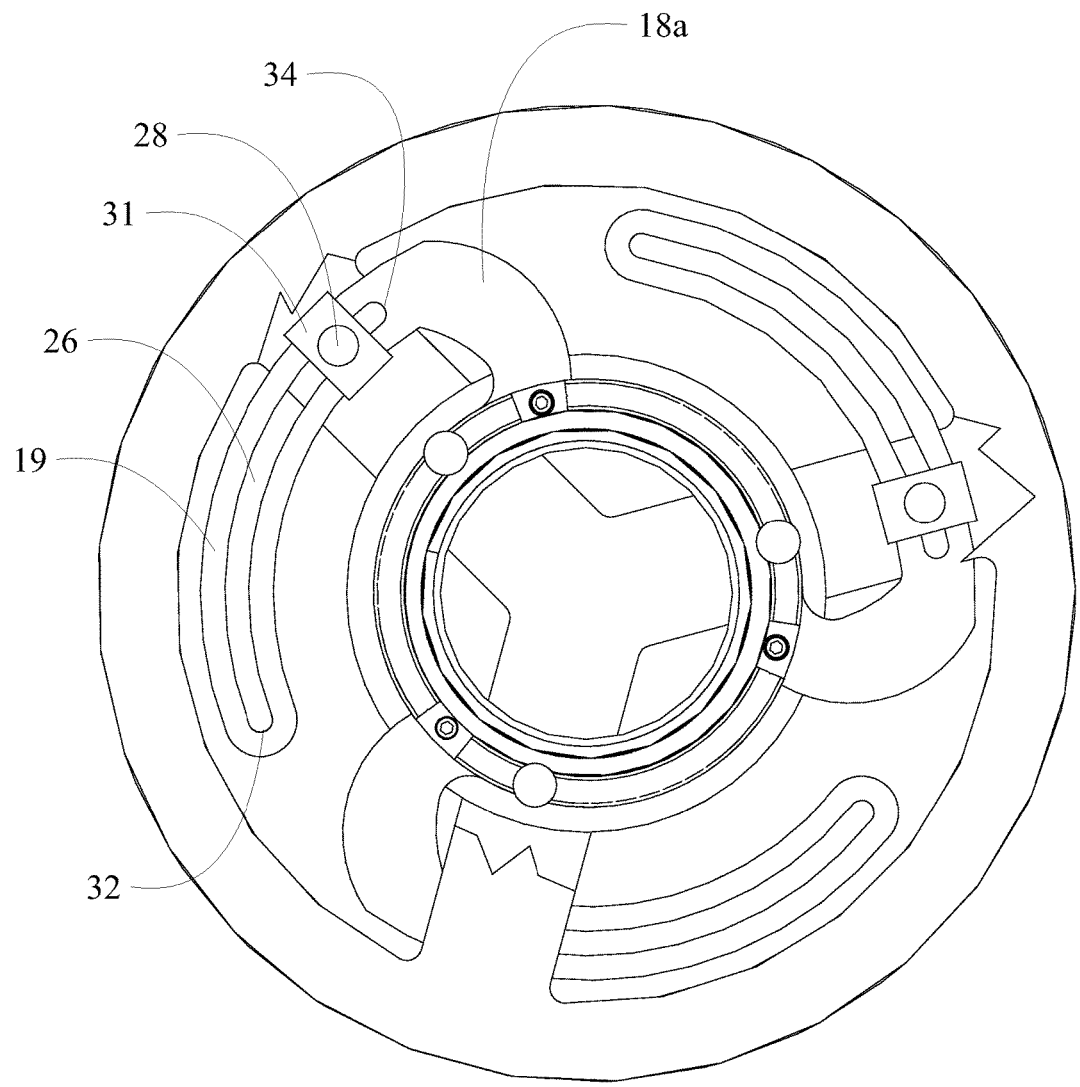
FIG. 3B is a top partial cutaway view of the TMD with the flexures rotated to substantially a minimum length.

The voice coil 10 can be actively powered and used to move the magnet 16 up or down from the neutral position shown in FIG. 1B. A large voltage applied to the voice coil by a control system, to be described in greater detail subsequently, pushes magnet 16 axially to engage bearing race ramps 22a or 22b, which are attached to the magnet 16, against bearing guides 24a or 24b, which are attached to the frame 14. Axial engagement of the ramps and guides causes rotation of the magnet 16. Rotation of the magnet 16 causes rotation of the attached flexures 18a and 18b. If the magnet 16 is pushed downwardly in the depiction in the drawings as shown in FIG. 2A, contact between the bearing race ramps 22b and the bearing guides 24b force the magnet to turn in a counter clockwise direction. If the magnet 16 is pushed upwardly in the depiction in the drawings as shown in FIG. 2B, contact between the bearing race ramps 22a and bearing guides 24a force the magnet to turn in a clockwise direction. The flexures 18a and 18b, which resiliently support the magnet 16 with respect to the frame 14, incorporate arcuate slots 26 which are substantially concentric around axis 20 and engage pins 28 extending from the pillars 20. The pins 28 are received within the slots 26, and each pin is positionable in the slot 26 for adjustment of an effective length of said flexure 18. Normally closed solenoids 30 lock down clamps 31 to secure the flexures when no voltage is applied and release the clamps when a voltage is applied. When the solenoids are locked, the flexures 18a and 18b are locked at a selected position along the slots 26 which centers the magnet and allows it to vibrate relative to the voice coil 10. The natural or resonant frequency of the vibration of the magnet mass in the TMD can be changed through changing the effective length of the flexures 18a and 18b by positioning the pins 28 and clamps 31 with respect to the slots 26. A clockwise motion of the magnet 16 lengthens the flexure along a range of the slots 26 terminating at a distal end 32 as shown in FIG. 3A, where a counter clockwise motion of the magnet 16 shortens the flexure along the range of the slots terminating at a proximal end 34 as shown in FIG. 3B. Clockwise rotation may be enabled via first ramps 22a attached to the magnet 16, which when moved in a first direction engage first guide elements 24a to cause the magnet 16 and flexural members 18a, 18b to rotate in a clockwise direction. Counterclockwise rotation may be enabled via second ramps 22b attached to the magnet 16, which when moved in a second direction engage second guide elements 24b to cause the magnet 16 and flexural members 18a, 18b to rotate in a counter-clockwise direction. A clamp 31 is actuated by a solenoid 30 to clamp on at least one flexural member, and is configured to allow the magnet 16 and flexural members 18a, 18b to rotate when the solenoid is in a first state, and to clamp the flexural members in a fixed position when the solenoid is in a second state. The solenoid 30 may be powered for activation in the first state, and deactivated in the second state whereby the clamp is engaged in a failure condition of the solenoid. Accordingly, rotation in the first direction lengthens the effective length of the flexural members and rotation in the second direction shortens the effective length of the flexural members, such that the tuned mass damper frequency is adjustable by changing the effective length of the flexure members. The frequency is adjustable over a range based on the location of the clamps 31 and pins 28 in the slots 26. When a large voltage is applied to the actuator to clock the magnet 16, a voltage is also applied by the control system to the solenoids 30 releasing the clamps 31 to allow sliding of the flexures relative to the pins 28 supported by the pillars 20.

Figure 4:
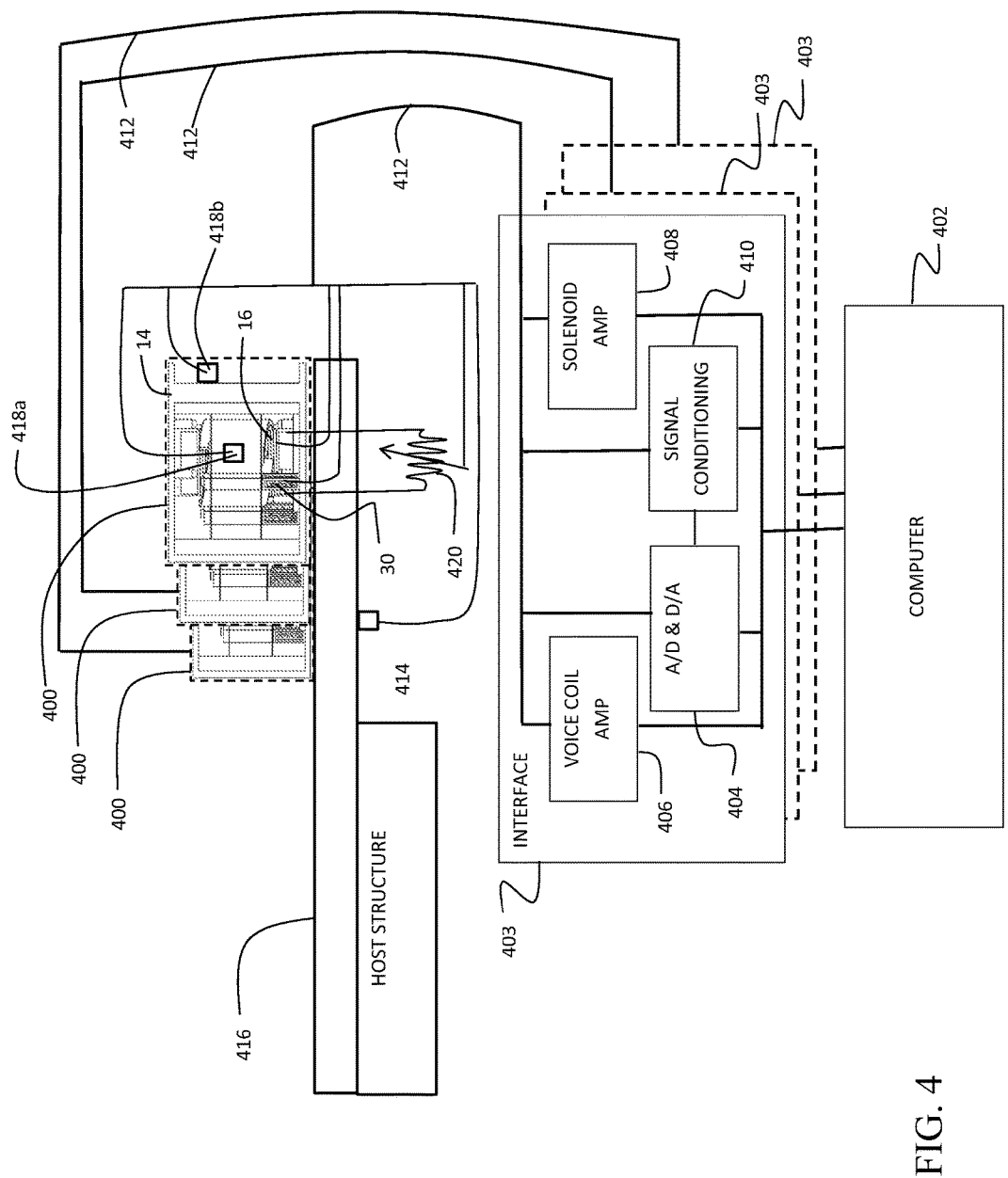
FIG. 4 is a block diagram of a control system for the TMD.

The damping of the TMD can be changed by varying resistance across the voice coil 10 using, for example, a digitally programmable analog resistor. Increasing the resistance makes the inductive interaction between the voice coil 10 and magnet 16 more lossy while decreasing the resistance makes the interaction less lossy. A control system as shown in FIG. 4 may be employed to actively control the voice coil 10 for clocking the magnet 16 to alter the resonant frequency of the TMD or to cause excitation of the magnet allowing the TMD to act like a shaker or a modal hammer. A control computer 402 employs control algorithms to act on inputs received through an control interface 403 which may include an analog to digital (A/D) and digital to analog (D/A) interface 404 and provides control output through a voice coil amplifier 406 to actively position or drive the voice coil 10 as previously described. The control system may include encoded instructions therein for calculating an optimum frequency range based on input from the at least one accelerometer. The control system is configured to activate the at least one solenoid actuated clamp 31 and control the voice coil 12 to rotate the magnet to adjust the flexural members 18a, 18b to an effective length corresponding to the calculated frequency. A solenoid amplifier 408 is connected to the control computer 402 to controllably release the solenoids 30 an associated clamps 31 as previously described. Various signal conditioning components 410 may also be employed. A removable tether 412 couples the control system components to the TMD 400 with connections to the solenoids 30 and voice coil 10 and additional connection to at least one accelerometer 414 on the host structure 416, at least one accelerometer 418a associated with the magnet 16 and at least one accelerometer 418b mounted to the frame 14. Data from the accelerometers is processed through the signal conditioning elements 410 and A/D in the A/D & D/A interface 404. A control connection in the tether 412 to a variable resistor 420, which is connected across the voice coil 10, allows adjustment of the lossy characteristics of the TMD under control of the control computer 402 through the D/A in the A/D & D/A interface 404.

Given a frequency band of interest associated with the host structure, the self-tuning TMD can be adjusted to a selected test frequency well below the lowest frequency in the band and measure a collocated transfer function between current into the voice coil and acceleration of the base. A current mode amplifier as one of the signal conditioning elements 410 would be required. Alternatively, a transfer function between voltage into the voice coil and the acceleration of the base could be used, however, this transfer function will be affected by addition of some damping through back EMF. The transfer function selected will give insight into the uncoupled behavior of the host structure and may be used as the starting point for an algorithm to tune the TMD. The measured transfer function will show lightly damped modes that are good candidates for damping to reduce the host structure response. The control system is configured to analyze a frequency band that includes more than one lightly damped resonance frequency and determine an optimum frequency and damping to minimize the effect of vibration. This technique may also be applied with multiple TMDs (shown as elements 400 with associated interfaces 403 in FIG. 4) mounted to the structure with at least one TMD connected for driving the voice coil as an actuator. With all of the TMDs tuned to the selected test frequency, the accelerometers in all TMDs could then be sampled to collect response data and the determination by the control system may be made for optimization of all of the TMDs to reduce response to a disturbance at or near the TMD which was driven as the actuator. Each TMD may then be adjusted using the voice coil to clock the magnets in each TMD as described above and the control computer may adjust the programmable resistance for each TMD to provide the desired response.

Figure 5:
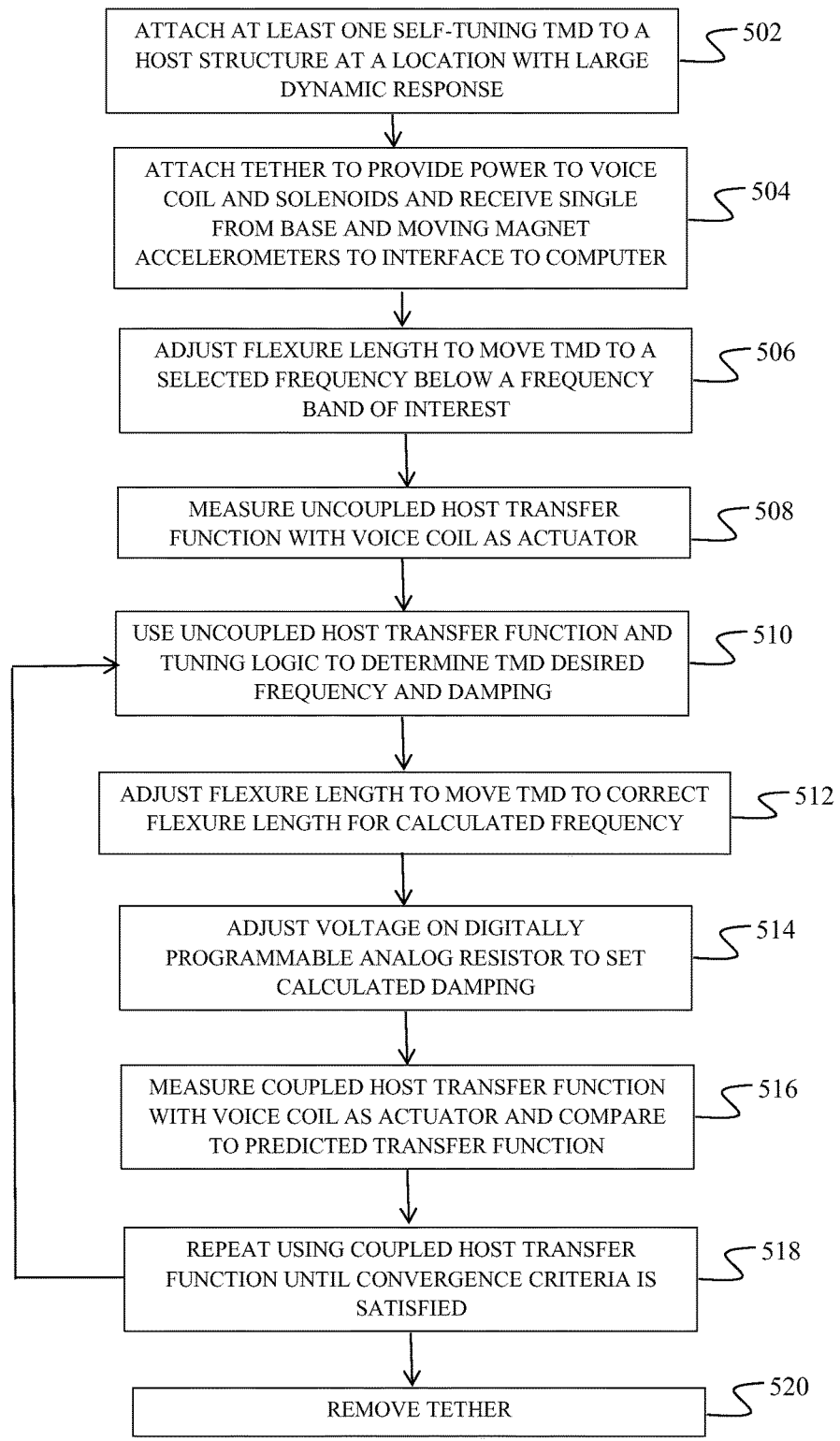
FIG. 5 is a flow chart depicting an exemplary method for adjustment and operation of the TMD.

As shown in FIG. 5, a self-tuning TMD having the structure of the described embodiment is attached to a host structure at a location with an anticipated large dynamic response, step 502. A tether is then attached to at least one TMD to provide power to the voice coil and solenoids and to receive signals from accelerometers mounted on the TMD frame, magnet and host structure, step 504. A control system is employed to release the flexure clamps and the TMD is adjusted by using the voice coil to urge the magnet and ramps into contact with the bearing guides to adjust the frequency of the TMD below the frequency band of interest and reclamp the flexures, step 506. The control system then actuates the voice coil as a shaker and measures the resulting uncoupled host transfer function, step 508. The uncoupled host transfer function and a predetermined tuning logic are employed to determine a preferred TMD frequency and damping, step 510. The control system is then employed to again release the flexure clamps and the TMD is adjusted by using the voice coil to urge the magnet and ramps into contact with the bearing guides to adjust flexure length to obtain the desired frequency of the TMD and reclamp the flexures, step 512. The control system them alters voltage on a digitally programmable analog resistor across the voice coil to set the desired damping, step 514. The control system may then again activate the voice coil as a shaker and measure the resulting coupled host transfer function with the accelerometers to compare to the predicted transfer function, step 516. Steps 506 through 516 may then be repeated until a convergence criteria is satisfied, step 518. The tether is then removed from the TMD, step 520 and the TMD is ready for autonomous operation for dynamically damping the host structure. While the steps herein are described with respect to at least one TMD, a plurality of TMDs may be connected, activated, measured and tuned as a group to be optimized for desired damping of the structure to which the TMDs are attached as previously described. A single TMD of the plurality may be activated as the shaker while all TMDs in the plurality may be measured and tuned.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A tuned mass damper comprising:
    a frame,
    a voice coil supported in the frame;
    a magnet concentric with the voice coil and movable relative to the frame via the voice coil; and,
    a plurality of flexures having a first end extending from the magnet and an arm releasably coupled to the frame, each flexure incorporating a slot in the arm, said slot receiving a pin supported from the frame said pin positionable in the slot for adjustment of an effective length of said flexure said flexures adjustable for a desired frequency of reciprocation of the magnet.

2. The tuned mass damper as defined in claim 1 further comprising:
    first ramps attached to the magnet which when moved in a first direction engage first guide elements to cause the magnet and flexural members to rotate in a clockwise direction;
    second ramps attached to the magnet which when moved in a second direction engage second guide elements to cause the magnet and flexural members to rotate in a counter-clockwise direction.

3. The tuned mass damper as defined in claim 2 further comprising:
    at least one clamp actuated by a solenoid on at least one flexural member and configured to allow the magnet and flexural members to rotate when the solenoid is in a first state, and to clamp the flexural members in a fixed position when the solenoid is in a second state,
    wherein rotation in the first direction lengthens the effective length of the flexural members and rotation in the second direction shortens the effective length of the flexural members, such that the tuned mass damper frequency is adjustable by changing the effective length of the flexure members.

4. The tuned mass damper as defined in claim 3 further comprising at least one accelerometer disposed on the magnet.

5. The tuned mass damper as defined in claim 4 further comprising a control system having encoded instructions therein for calculating an optimum frequency range based on input from the at least one accelerometer, the control system configured to activate the at least one solenoid actuated clamp and control the voice coil to rotate the magnet to adjust the flexural members to an effective length corresponding to the calculated frequency.

6. The tuned mass damper as defined in claim 5, wherein the control system is configured to analyze a frequency band that includes more than one lightly damped resonance frequency and determine an optimum frequency and damping to minimize the effect of vibration.

7. The tuned mass damper of claim 6, further comprising a variable resistance in series with the voice coil, said variable resistance responsive to the control system to adjust the damping of the tuned mass damper.

8. The tuned mass damper as defined in claim 5 further comprising a tether removably connecting the control system to the voice coil and the at least one accelerometer.

9. The tuned mass damper as defined in claim 3 wherein the solenoid is powered for activation in the first state and deactivated in the second state whereby the clamp is engaged in a failure condition of the solenoid.

10. A method for operation of a tunable mass damper (TMD) comprising:
    attaching at least one TMD to a structure, the TMD having a voice coil and concentric magnet as a moving mass supported by flexures to a host structure at a location with an anticipated large dynamic response;
    releasing flexure clamps;

adjusting flexure length on the TMD by using the voice cod to urge the magnet and associated ramps into contact with bearing guides to rotate the magnet and flexures to obtain a desired frequency of the TMD;

reclamping the flexures for operation of the TMD.

11. The method as defined in claim 10 further comprising:

adjusting the flexure length by using the voice coil to urge the magnet and ramps into contact with the bearing guides to adjust the frequency of the TMD below the frequency band of interest;

reclamping the flexures;

actuating the voice coil as a shaker;

measuring the resulting uncoupled host transfer function; and, employing the uncoupled host transfer function and a predetermined tuning logic to determine a preferred TMD frequency and damping.

12. The method as defined in claim 11 further comprising:

activating the voice coil as the shaker;

measuring the resulting coupled host transfer function with the accelerometers to compare to the predicted transfer function; and repeating the steps of adjusting flexure length, activating the voice coil as a shaker and measuring the resulting coupled host transfer function to obtain a desired frequency of the TMD until a convergence criteria is satisfied.

13. The method as defined in claim 12 further comprising attaching a tether to the TMD to provide power to the voice coil and solenoids and to receive signals from accelerometers mounted on the TMD frame, magnet and host structure.

14. The method as defined in claim 13 further comprising removing the tether from the TMD for autonomous operation of the TMD for dynamically damping the host structure.

15. The method as defined in claim 13 further comprising altering voltage on a digitally programmable analog resistor across the voice coil to set a desired damping.

16. The method as defined in claim 11 wherein the at least one TMD comprises a plurality of TMDs and the step of activating the voice coil comprises activating the voice coil of a selected one of the TMDs as a shaker, the step of measuring the resulting uncoupled host transfer function comprises measuring the resulting uncoupled host transfer function for each of the TMDs, the steps of releasing the flexure clamps, adjusting the flexure length and reclamping the flexure clamps are performed for each TMD.

17. A structural damping system comprising:

a host structure having a location with anticipated high dynamic response;

at least one TMD having a frame mounted to the host structure at the location;

a voice coil supported in the frame;

a magnet concentric with the voice coil and movable relative to the frame via the voice coil;

a plurality of flexures having a first end coupled to the magnet and an arm releasably coupled to the frame, said flexures adjustable for a desired frequency of reciprocation of the magnet;

at least one accelerometer attached to the voice coil;

a control system having encoded instructions therein for calculating an optimum frequency range based on input from the at least one accelerometer, the control system configured to control the voice coil to rotate the magnet to adjust the flexural members to an effective length corresponding to the calculated frequency.

18. The structural damping system as defined in claim 17, wherein the control system is configured to analyze a frequency band that includes more than one lightly damped resonance frequency and determine an optimum frequency and damping to minimize the effect of vibration.

19. The structural damping system as defined in claim 17 wherein each flexure incorporates a slot in the arm, said slot receiving a pin supported from the frame said pin positionable in the slot for adjustment of an effective length of said flexure further comprising:

first ramps attached to the magnet which when moved in a first direction engage first guide elements to cause the magnet and flexural members to rotate in a clockwise direction;

second ramps attached to the magnet which when moved in a second direction engage second guide elements to cause the magnet and flexural members to rotate in a counter-clockwise direction;

at least one clamp actuated by a solenoid on at least one flexural member and configured to allow the magnet and flexural members to rotate when the solenoid is in a first state, and to clamp the flexural members in a fixed position when the solenoid is in a second state, wherein rotation in the first direction lengthens the effective length of the flexural members and rotation in the second direction shortens the effective length of the flexural members, such that the tuned mass damper frequency is adjustable by changing the effective length of the flexure members.

20. The structural damping system as defined in claim 17 where in the at least one TMD comprises a plurality of TMDs.

* * * * *